(12) United States Patent
Egedal et al.

(10) Patent No.: US 9,166,509 B2
(45) Date of Patent: Oct. 20, 2015

(54) METHOD FOR OPERATING A WIND FARM, WIND FARM CONTROLLER AND WIND FARM

(75) Inventors: Per Egedal, Herning (DK); Sathees Kumar, Herning (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 549 days.

(21) Appl. No.: 13/613,513

(22) Filed: Sep. 13, 2012

(65) Prior Publication Data
US 2013/0249215 A1 Sep. 26, 2013

(30) Foreign Application Priority Data

Sep. 20, 2011 (EP) .................................... 11182016

(51) Int. Cl.
| | |
|---|---|
| *H02P 9/02* | (2006.01) |
| *H02J 3/16* | (2006.01) |
| *H02J 3/28* | (2006.01) |
| *H02J 3/38* | (2006.01) |
| *H02J 1/10* | (2006.01) |

(52) U.S. Cl.
CPC ... *H02P 9/02* (2013.01); *H02J 3/16* (2013.01); *H02J 3/28* (2013.01); *H02J 3/386* (2013.01); *Y02E 10/722* (2013.01); *Y02E 10/763* (2013.01); *Y02E 10/766* (2013.01); *Y02E 40/34* (2013.01); *Y02E 70/30* (2013.01)

(58) Field of Classification Search
USPC ............................................. 307/43
See application file for complete search history.

(56) References Cited

U.S. PATENT DOCUMENTS

| | | | |
|---|---|---|---|
| 7,908,036 B2 | 3/2011 | Kirchner et al. | |
| 2010/0138058 A1 | 6/2010 | Kirchner et al. | |
| 2012/0061959 A1* | 3/2012 | Yasugi et al. ................. | 290/44 |

FOREIGN PATENT DOCUMENTS

| | | |
|---|---|---|
| CN | 101114771 A | 1/2008 |
| EP | 1855367 A1 | 11/2007 |
| WO | WO 2004059814 A2 | 7/2004 |

* cited by examiner

*Primary Examiner* — Robert Deberadinis (57) ABSTRACT

The disclosure concerns a method for operating a wind farm, the wind farm includes a wind turbine, and an energy storage device, the wind farm being connected to an external grid, the method comprising determining a demanded active power, determining a demanded reactive power, determining power production of the wind turbine, and charging the energy storage device, when the power production is above the demanded active power, the demanded reactive power, or the vector sum of demanded active power and demanded reactive power. Furthermore, corresponding wind farm controllers, wind farms, program elements, and computer readable media are subject of the current disclosure.

13 Claims, 7 Drawing Sheets

METHOD FOR OPERATING A WIND FARM, WIND FARM CONTROLLER AND WIND FARM

CROSS REFERENCE TO RELATED APPLICATIONS

This application claims priority of European Patent Office application No. 11182016.3 EP filed Sep. 20, 2011. All of the applications are incorporated by reference herein in their entirety.

FIELD OF INVENTION

The present disclosure relates to the field of power generation by wind turbines.

BACKGROUND OF INVENTION

Ordinary power plants operated with nuclear power or combustion are to be substituted with renewable energy sources such as wind farms, solar power stations and wave farms for example. In particular, wind turbines are becoming more and more popular for ecological power generation. The kinetic energy of the wind is converted to rotational energy of a wind turbine rotor by the wind turbine rotor blades and there from to electric energy by a generator.

SUMMARY OF INVENTION

One of the main challenges associated with the substitution of conventional power plants with renewable energy sources is delivering the power at the time when it is actually demanded by the consumers. Conventional power plants may simple burn more (less) fuel when the demand augments (decreases).

However, the power renewable energy sources deliver cannot be regulated in such an easy way. The amount of wind, for example, may be the same over a whole day. However, power demand may deviate during the day, in particular may be higher at noon for cooking. Moreover, there may be even no wind at all. Solar power stations on the other hand may provide power only during daytime and not when it is needed for illumination.

U.S. Pat. No. 7,908,036 B2 and US 2010/0138058 A1 describe wind farms, groups of several wind turbines at one location, being operated based on "ramp rates", i.e. the rate of change in power production a wind turbine can provide at normal operation.

However, there may a need for a method for operating a wind farm and a wind farm, which provide additional support, in particular concerning reactive power support and voltage support, for an external grid.

This need may be met by the subject matter according to the independent claims. Embodiments of the present disclosure are described by the dependent claims.

According to a first aspect, there is provided a method for operating a wind farm, the wind farm comprising a wind turbine, and an energy storage device, the wind farm being connected to an external grid, the method comprising determining a demanded active power, determining a demanded reactive power, determining power production of the wind turbine, and charging the energy storage device, when the power production is above the demanded active power, the demanded reactive power, or the vector sum of demanded active power and demanded reactive power.

According to a first embodiment of the method for operating a wind farm, the method further comprises discharging the energy storage device, when the power production is below the demanded active power, the demanded reactive power, or the sum of demanded active power and demanded reactive power.

Discharging the energy storage device thus may allow the wind farm to better comply with external requirements. The amount of stand-by conventional power stations may be reduced as in low wind situations additional power may be provided by the energy storage device.

According to another embodiment of the method for operating a wind farm, the method further comprises reducing the power production, when the power production is above a rated power production of the wind turbine.

Reducing the power production when the power production is above a rated power production of the wind turbine may reduce the loads experienced by the wind turbine and may accordingly extend the lifetime of the wind turbine.

According to yet another embodiment of the method for operating a wind farm, the method further comprises reducing the power production, when the power production is above the sum of a rated charging power of the energy storage device and either the demanded active power or the demanded reactive power or the vector sum of demanded active power and demanded reactive power.

Reducing the power production, when the power production is above the sum of the rated charging power of the energy storage device and either the demanded active power or the demanded reactive power or the vector sum of demanded active power and demanded reactive power and may be enhance the lifetime the energy storage device.

According to a further embodiment of the method for operating a wind farm, the method further comprises reducing the power production, when the power production is above either the demanded active power or the demanded reactive power or the vector sum of demanded active power and demanded reactive power, and when furthermore the energy storage device is full.

Overcharging of the energy storage device may result in overheating of the energy storage device. Reducing the power production, when the power production is above either the demanded active power or the demanded reactive power or the vector sum of demanded active power and demanded reactive power, and when furthermore the energy storage device is full may thus avoid damaging the energy storage device.

According to a still further embodiment of the method for operating a wind farm, the method further comprises determining the external grid voltage and providing correctional voltage via the energy storage device, when the external grid voltage differs from a predetermined external grid voltage.

Determining the external grid voltage and providing correctional voltage via the energy storage device, when the external grid voltage differs from a predetermined external grid voltage may reduce voltage fluctuations experienced by the consumers connected through the external grid voltage.

According to a second aspect, there is provided a wind farm controller, the wind farm controller being adapted for operating a wind farm according to a method as set forth above.

The method as set forth hereinbefore may be implemented with a wind farm controller such that manual interference of operating personal may be reduced to a minimum or dispensed with.

According to an embodiment of the wind farm controller, the wind farm controller comprises a memory for storing data indicative of the amount of energy stored within the energy storage element.

Information about the amount of energy stored within the energy storage element may help to decide when power production should be reduced to avoid overcharging of the energy storage element. Furthermore, such information may be useful to decide if additional power can and should be provided by the wind farm, when market prices for power are particularly high.

According to a third aspect, there is provided a wind farm comprising a wind turbine, an energy storage element, and a wind farm controller as set forth above. Such a wind farm may be more profitable as it may harvest more energy from the wind than a wind farm without an energy storage element.

According to a first embodiment of the wind farm, the energy storage element comprises a battery and/or a flywheel and/or a superconducting magnetic energy storage.

Several methods for storing energy have been described in the state of the art. Batteries have the advantage of having been researched intensively and the influence of operating conditions on the lifetime is well known. Flywheels may provide particularly high power for a short amount of time without comprising lifetime. Superconducting magnetic energy storages may have a low self-discharge.

According to another embodiment of the wind farm, the energy storage element comprises a dynamic voltage restorer. A dynamic voltage restorer may be used to maintain the voltage within the wind farm essentially constant in case of a voltage drop of the external grid.

According to yet another embodiment of the wind farm, the energy storage element comprises a bypass switch. A bypass switch may be used to decouple the energy storage element from a wind farm grid. This may be useful to avoid that grid failures, e.g. voltage spikes, may damage the energy storage element, in particular a battery or a super conducting magnetic energy storage thereof.

According to a further embodiment of the wind farm, the energy storage element comprises an injection transformer. An injection transformer may provide galvanic insulation of the energy storage element from a wind farm grid. Furthermore, an injection transformer may allow operating the energy storage element with a lower voltage. Power components rated for a lower voltage may be cheaper.

According to a forth aspect there is provided a program element for operating a wind turbine, the program element, when being executed by a data processor, is adapted for controlling and/or for carrying out a method as set forth above.

The program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The program element may be available from a network, such as the World Wide Web, from which it may be downloaded.

According to a fifth aspect there is provided a computer readable medium on which there is stored a computer program for processing a physical object, the computer program, when being executed by a data processor, is adapted for controlling and/or for carrying out a method as set forth above.

The computer-readable medium may be readable by a computer or a processor. The computer-readable medium may be, for example but not limited to, an electric, magnetic, optical, infrared or semiconductor system, device or transmission medium. The computer-readable medium may include at least one of the following media: a computer-distributable medium, a program storage medium, a record medium, a computer-readable memory, a random access memory, an erasable programmable read-only memory, a computer-readable software distribution package, a computer-readable signal, a computer-readable telecommunications signal, computer-readable printed matter, and a computer-readable compressed software package.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment. The disclosure will be described in more detail hereinafter with reference to examples of embodiment but to which the disclosure is not limited.

DETAILED DESCRIPTION OF INVENTION

Figure 1:
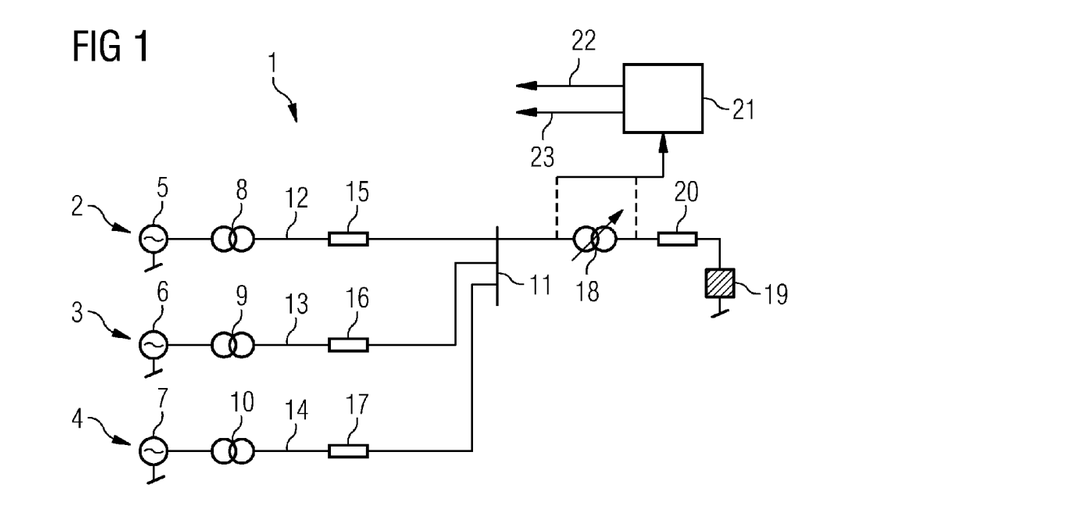
FIG. 1 shows a schematic overview of an embodiment of a wind farm according to the state of the art.

FIG. 1 shows schematic overview of an embodiment of a wind farm 1 according to the state of the art. The wind farm 1 comprises a first wind turbine 2, a second wind turbine 3, and a third wind turbine 4. The wind turbine generators 5, 6, 7 of the respective wind turbines 2, 3, 4 are connected to the low voltage side of corresponding wind turbine transformers 8, 9, 10. The transformed power is guided from the medium voltage side of the respective wind turbine transformer 8, 9, 10 to a point of common coupling 11 via cables 12, 13, 14 with impedances 15, 16, 17 respectively. After the point of common coupling the power is further transformed to an even higher voltage via the wind farm transformer 18. The power is then fed into an external grid 19 via a reactive power compensator 20. A wind farm controller 21 monitors the voltage, frequency, active power, and reactive power before and/or after the wind farm transformer 18 and provides the wind turbines 2, 3, 4 with control signals 22, 23. The control signals 22, 23 are used to control the power each wind turbine 2, 3, 4 produces and the rotational speed of the wind turbine rotor of each wind turbine 2, 3, 4.

Figure 2:
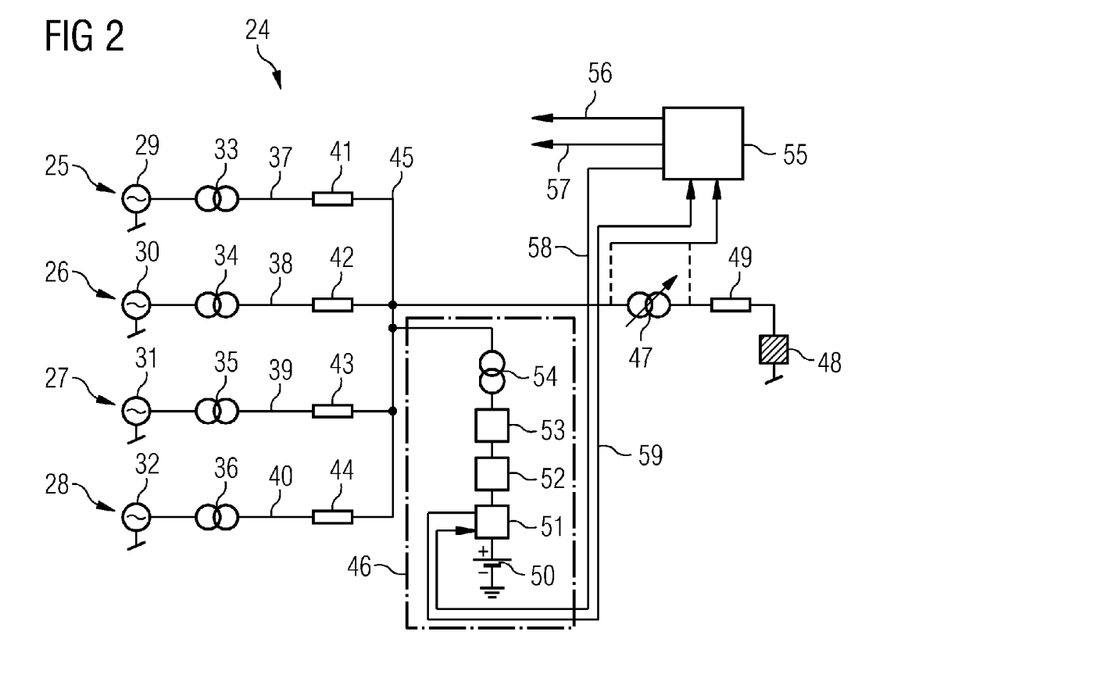
FIG. 2 shows a schematic overview of an embodiment of a wind farm.

FIG. 2 shows a schematic overview of an embodiment of a wind farm 24 with a first wind turbine 25, a second wind turbine 26, a third wind turbine 27, and a forth wind turbine 28. The wind turbine generators 29, 30, 31, 32 of the wind turbines 25, 26, 27, 28 respectively are rated for a power production of 2.3 MW. The wind turbine transformers transform the power from 690 V to 33 kV. Via cables 37, 38, 39, 40 with impedances 41, 42, 43, 44 the power is guided to a point of common coupling 45. From the point of common coupling 45 the power is guided to the medium voltage side of the wind farm transformer 47 where the power is typically transformed from 33 kV to 132 kV. However, the transformation ratio may be changeable. This may enhance the adaptability of the wind farm to different external grids 48. Furthermore, a wind farm transformer with a changeable transformation ratio may provide enhanced external grid support in case of external grid failures. From the high voltage side of the wind farm transformer 47 the power is provided to the external grid 48 via a reactive power compensator 49. The reactive power compensator 49 in this embodiment has a ratio reactance to resistance of 10. An energy storage device 46 is coupled to the point of common coupling 45. However, in an alternative embodiment the energy storage device 46 could as well be coupled to the high voltage side of the wind farm transformer 47. The energy storage device 46 comprises a battery 50, a control circuit 51, a converter 52, a filter unit 53, and an injection transformer 54. The control circuit 51 controls the charging and discharging of the battery 50 with direct current. The converter 52 converts the direct current to the alternating current to be provided at the point of common coupling 45. The output of the converter 52 is connected to the filter unit 53, which smoothes the current before it is fed into the injection transformer 45. The injection transformer 54 may in particular be a three-phase transformer. The injection transformer 54 may not only be used to inject the alternating current at the point of common coupling 45, but may also transform the voltage at the point of common coupling 45 side to a lower value at the filter 52 side. This may allow using low voltage devices for the energy storage element 46. A wind farm controller 55 measures the voltage, frequency, active power, and reactive power before and/or after the wind farm transformer 47. Based on these parameters the wind farm controller 55 controls the wind turbines 25, 26, 27, 28 and the energy storage element 46, in particular the control circuit 51, via control signals 56, 57, 58, 59. The control circuit 51 may communicate with the wind farm controller 55 bidirectional to prevent the wind farm controller from performing frequency control. The wind farm controller 55 may for example determine how much power is to be extracted from the energy storage element 46 via the control signal 58 and at the same time receive feedback from the control circuit 51 about the remaining energy level of the battery 50.

Figure 3:
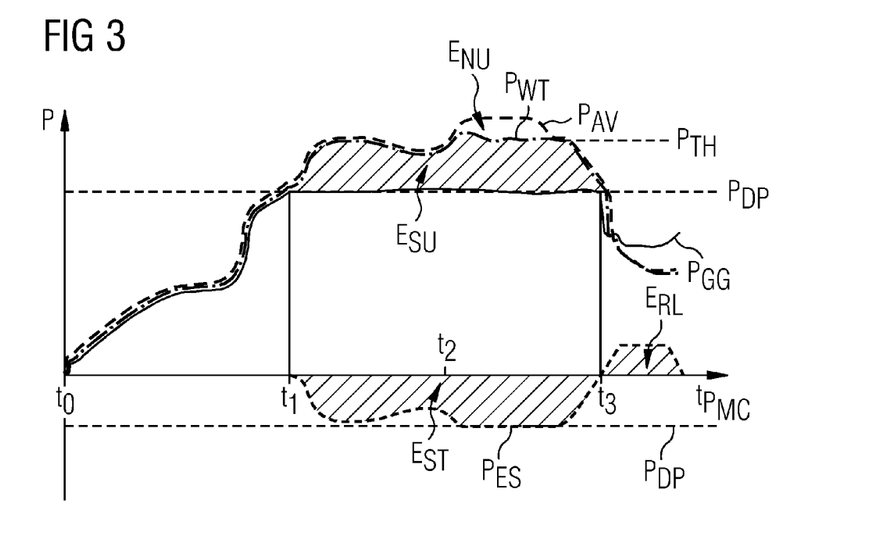
FIG. 3 illustrates an embodiment of a method for operating a wind farm.

FIG. 3 illustrates an embodiment of a method for operating a wind farm. The diagram shows the development of the power available in view of the wind currently blowing $P_{AV}$, active power the wind turbines actually produce $P_{WT}$, the active power the wind farm provides to a external grid $P_{GG}$, and active power the energy storage element stores and releases $P_{ES}$ versus time.

When the wind starts at $t_0$ to blow the wind turbine may use essentially all of the power available $P_{AV}$ to produce active power $P_{WT}$. No energy has been stored in the energy storage element yet. Accordingly the active power the wind farm provides to the external grid $P_{GG}$ is equal to $P_{WT}$ and $P_{AV}$. When the power available $P_{AV}$ surpasses at time $t_1$ the active power demanded by consumers $P_{DP}$ the wind turbines may still use all the active power available $P_{AV}$ to generate active power $P_{WT}$. The active power provided to the external grid $P_{GG}$ is reduced by active power $P_{ES}$ used to charge the energy storage element. In this way the supplemental energy $E_{SU}$ may be retained in the energy storage element as stored energy $E_{ST}$. The charging power of the energy storage element may be limited by a certain threshold power $P_{TH}$. If the power available $P_{AV}$ exceeds the demanded active power $P_{DP}$ by an amount of more than $P_{TH}$ at $t_2$ the active power produced by the wind turbines $P_{WT}$ may be reduced to avoid damaging the energy storage element. When the wind reduces and the power available $P_{AV}$ becomes lower than the demanded power PDP energy $E_{RL}$ may be released from the energy storage element, such that more active power $P_{GG}$ may be provided to the external grid. In this way even in low wind conditions consumer demands may be better fulfilled.

Figure 4:
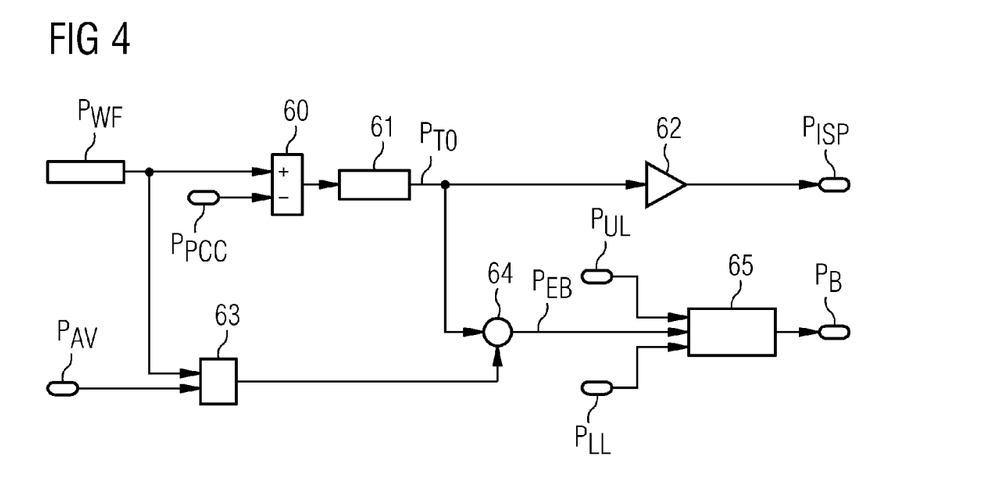
FIG. 4 illustrates a control strategy for an wind farm.

FIG. 4 illustrates an control strategy for an wind farm. A comparator 60 compares the power to be provided by the wind farm PWF with the power $P_{PPC}$ available at a point of common coupling of wind turbines and an energy storage element of the wind farm. The difference thereof is provided to a wind farm controller 61, which determines a new power $P_{TO}$ to be provided by the wind turbines. A divisor 62 divides the value of the power $P_{TO}$ with the number of wind turbines concerned and the individual set points $P_{ISP}$ are distributed to the wind turbines.

Element 63 monitors the power to be provided by the wind farm $P_{WF}$ and the power $P_{AV}$, which is available due to current wind condition. If $P_{AV}$ is greater than $P_{WF}$ element 63 transmits the value of $P_{AV}$ to comparator 64, where it will be subtracted from $P_{TO}$. The resulting difference $P_{EB}$ will be negative and hence the control circuit 65 will start charging the battery with a positive power $P_B$. The control circuit may be provided with an input for setting an upper power limit $P_{UL}$ and a lower power limit $P_{LL}$ for charging and/or discharging the battery.

Figure 5:
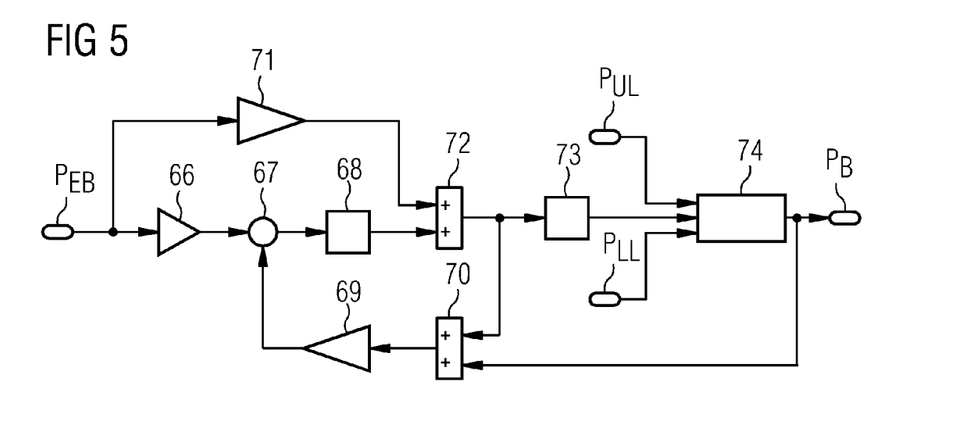
FIG. 5 shows an embodiment of a control circuit.

FIG. 5 shows an embodiment of a control circuit 65, which may be used for the implementation as has been described with reference to FIG. 4. $P_{EB}$ may be fed through the control circuit, which may be a PI controller with anti-windup. The control circuit may comprise amplifier circuits 71, 69, a divisor 66, a comparator 67, an integrator 68, adders 72, 70. Furthermore, a rate limiter 73 and a saturation dynamic control circuit 74 may be included. The saturation dynamic control circuit 74 may be influenced through an input for an upper power limit $P_{UL}$ and a lower power limit $P_{LL}$. The control circuit 65 finally determines the charging power $P_B$ for the battery. The upper power limit $P_{UL}$ and the lower power limit $P_{LL}$ may be event dependent, e.g. depending on power demand from a transmission system operator, market price, frequency events, etc. The highest value of these limits may be the max charging power threshold, which dictates how much power flow the battery may tolerate during charging/discharging.

Figure 6:
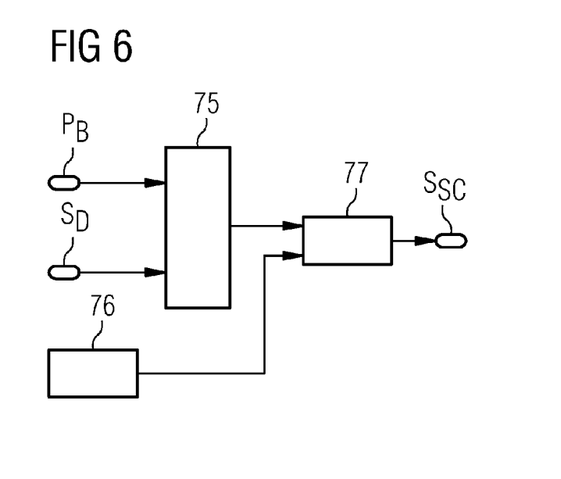
FIG. 6 shows an stop charging strategy.

FIG. 6 shows a strategy to avoid over-charging the battery. The charging power $P_B$ is monitored and integrated with an integrator 75 to obtain the amount of stored energy. The integrator monitors furthermore receives a signal $S_D$, when power from the energy storage element is fed into the external grid, the battery is discharged. If the amount of stored energy surpasses the maximum energy level 76 the battery may store, the comparator 77 emits a signal $S_{SC}$ that charging should be stopped.

Figure 7:
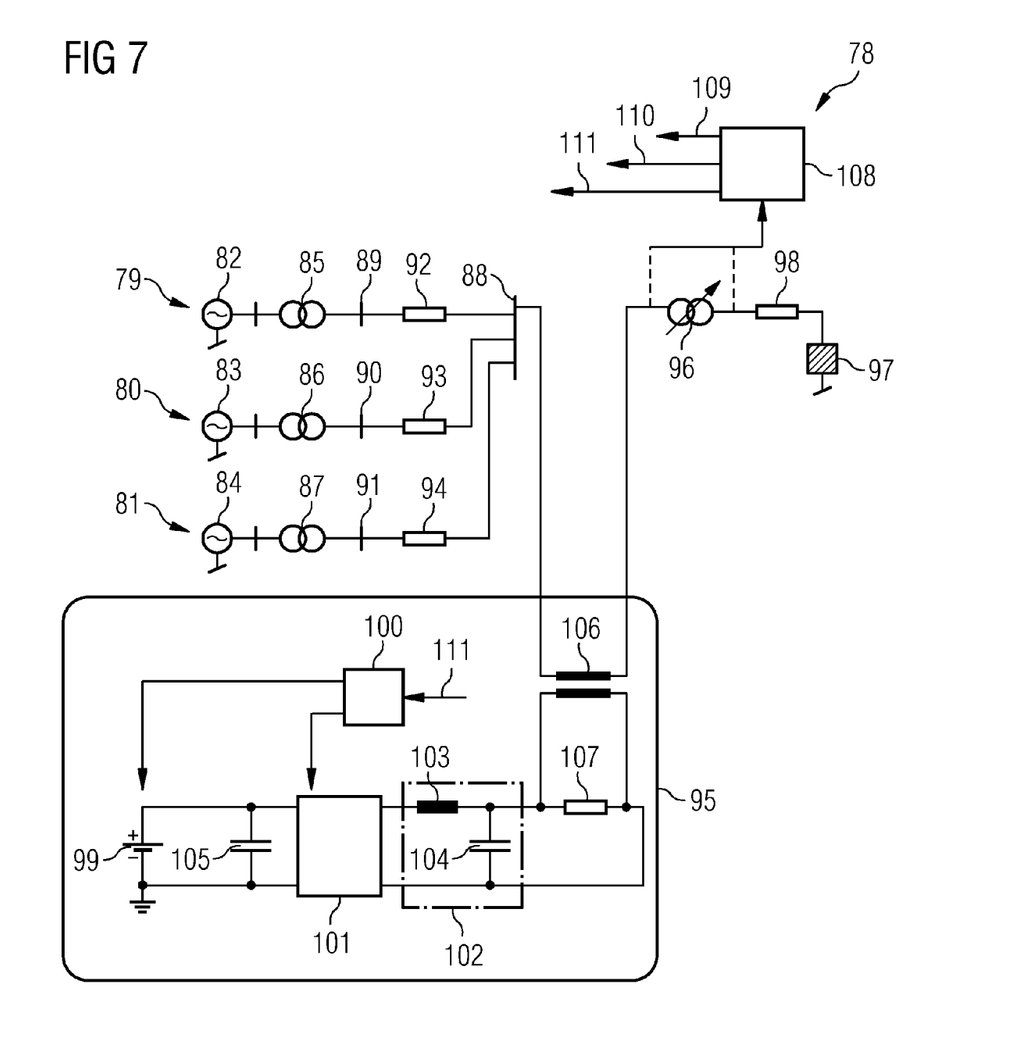
FIG. 7 shows a schematic overview of an embodiment of a wind farm.

FIG. 7 shows a schematic overview of an embodiment of a wind farm 78. Comparable to the embodiment depicted in FIG. 2 the wind turbines 79, 80, 81 each comprise a wind turbine generator 82, 83, 84, a wind turbine transformer 85, 86, 87, and are connected to a point of common coupling 88 via cables 89, 90, 91 with impedances 92, 93, 94. An energy storage element 95 is connected to the point of common coupling 88, too. After the point of common coupling a wind farm transformer 96 is provided for adapting the voltage to the voltage of the external grid 97. The wind farm 78 is connected to the external grid 97 via a reactive power compensator 98. The energy storage element 95 comprises a battery 99, a dynamic voltage restorer 100, a converter 101 for converting alternative current to direct current a filter 102, a bypass switch 107 and an injection transformer 106. The inductivity 103 and the capacity 104 of the filter 102 smoothes the alternative current provided by the converter 101. This may be achieved by removing the unnecessary higher order harmonic components generated by the converter 101. The bypass switch 107 allows decoupling of the energy storage element 95 from the point of common coupling 88. This may protect the energy storage element 95 in case of grid failures. A capacity 105 may prevent that the battery 99 is subjected to alternating current. The wind farm controller 108 via signal 111 may control the dynamic voltage restorer 100. The wind farm controller 108 may measure the voltage, frequency, active power and/or reactive power before and/or after the wind farm transformer 96. Based on the parameters the wind farm controller 108 may control the wind turbines 79, 80, 81 and the energy storage element 95, in particular the dynamic voltage restorer 100, via control signals 109, 110, 111. The dynamic voltage restorer 100 influences the converter 101 and the battery 99 such that the energy storage element 95 injects power at the point of common coupling 88, which has a predetermined frequency and voltage as well as predetermined reactive and active parts. The maximum compensation ability of the dynamic voltage restorer 100 may be dependent on the amount of active power, which may be provided by the battery. The converter 101 may be a pulse-width modulated voltage source inverter. The pulse-width modulated voltage source inverter may be the same used in wind turbines. The high voltage side of the injection transformer 106 may be connected in series with the distribution line connecting the point of common coupling 88 with the wind farm transformer 96, while the low voltage side of the injection transformer 106 may be connected to the other components of the energy storage device 95. For a three-phase dynamic voltage restorer 100, three single-phase voltage injection transformers 106 or one three-phase voltage injection transformer 106 may be connected to the distribution line. For a single-phase dynamic voltage restorer 100 one single-phase voltage injection transformer 106 may be sufficient. For a three-phase dynamic voltage restorer 100 a three-phase voltage injection transformer 106 in either delta/open or star/open configuration may be used. The injection transformer 106 may increase the voltage supplied by the filtered output of the converter 101 to a desired level and may at the same time isolate the energy storage device 95 from the other components of the wind farm 78.

Figure 8:
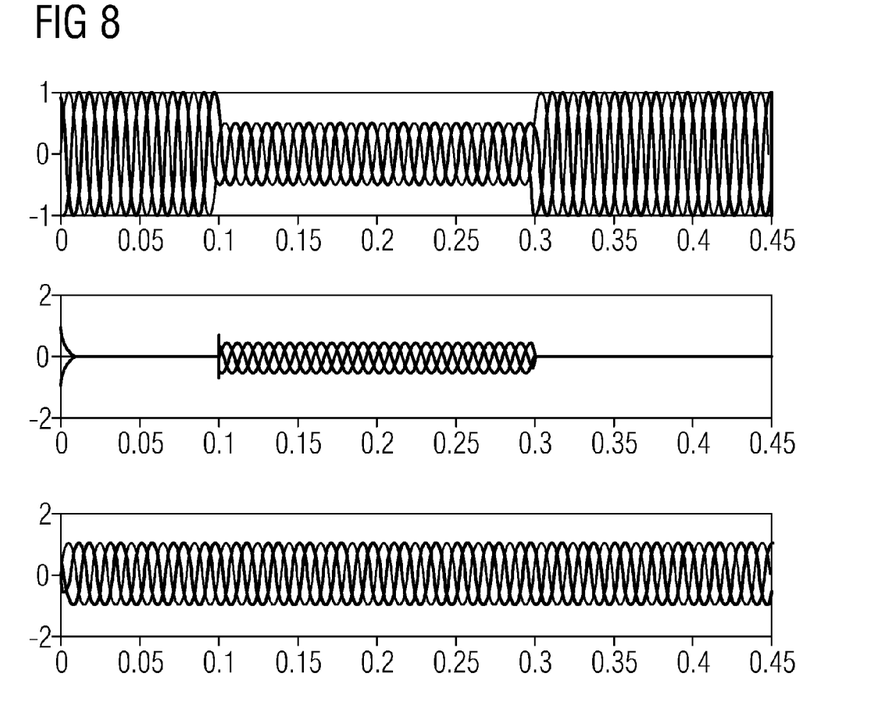
FIG. 8 shows a voltage scenario.
Figure 9:
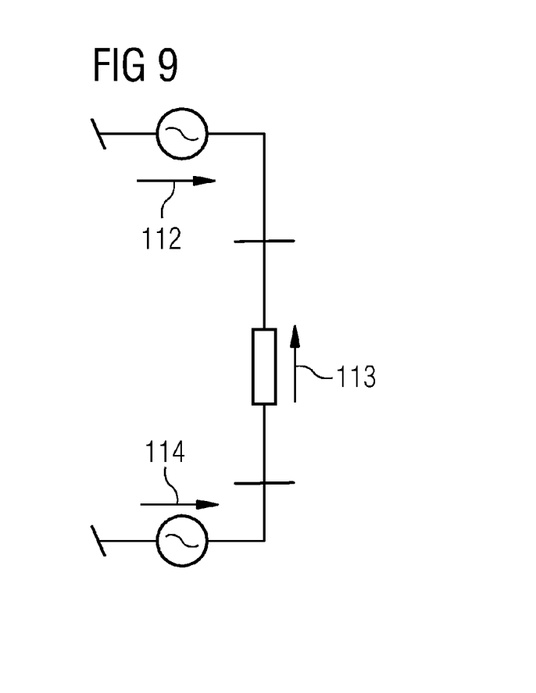
FIG. 9 shows a visualization of potentials.

The wind farm controller may detect drops in voltage and distribute control signals 111 to the energy storage element 95. A typical voltage scenario is shown in FIG. 8. The upper plot of FIG. 8 shows the voltage at the external grid, for example the external grid 97 shown in FIG. 7. In case of an offshore park the voltage 114 may be measured, for example, at the connection point at the mainland. In case the voltage drops the dynamic voltage restorer 100 may receive signals 111 from the wind farm controller 108 such that the energy storage device 95 establishes the required voltage 113 as shown in the intermediate plot of FIG. 8. The voltage at the point of common coupling 88 shown in the lower plot of FIG. 8 would therefore amount to the sum 112 of these voltages. FIG. 9 shows a visualization of these potentials.

Figure 10:
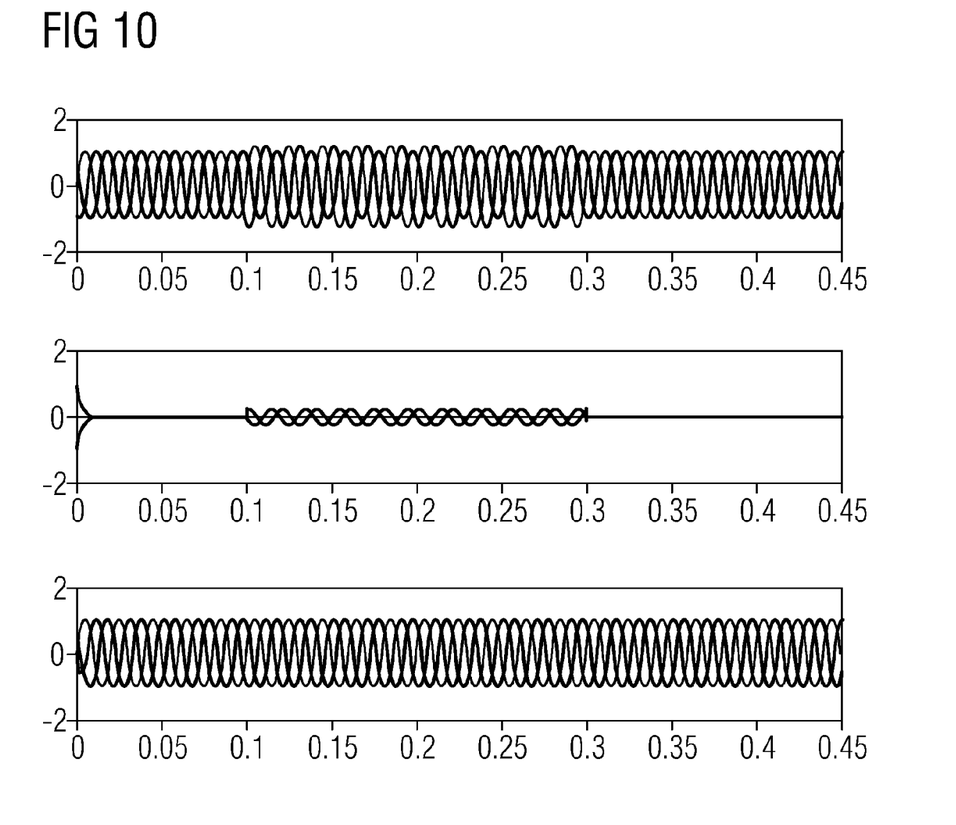
FIG. 10 shows a voltage scenario.

FIG. 10 shows an voltage scenario where the voltage of two phases is higher than rated (see upper diagram). With the dynamic voltage restorer 100 the voltage of these two phases may be reduced by an amount shown in the intermediate diagram such that finally all three phases have the rated voltage as shown in the diagram below.

According to some embodiments, a single energy storage element may be connected to the point of common coupling. However, according to other embodiments a plurality of energy storage elements may be provided. These energy storage elements may furthermore be included in the individual wind turbines.

Figure 11:
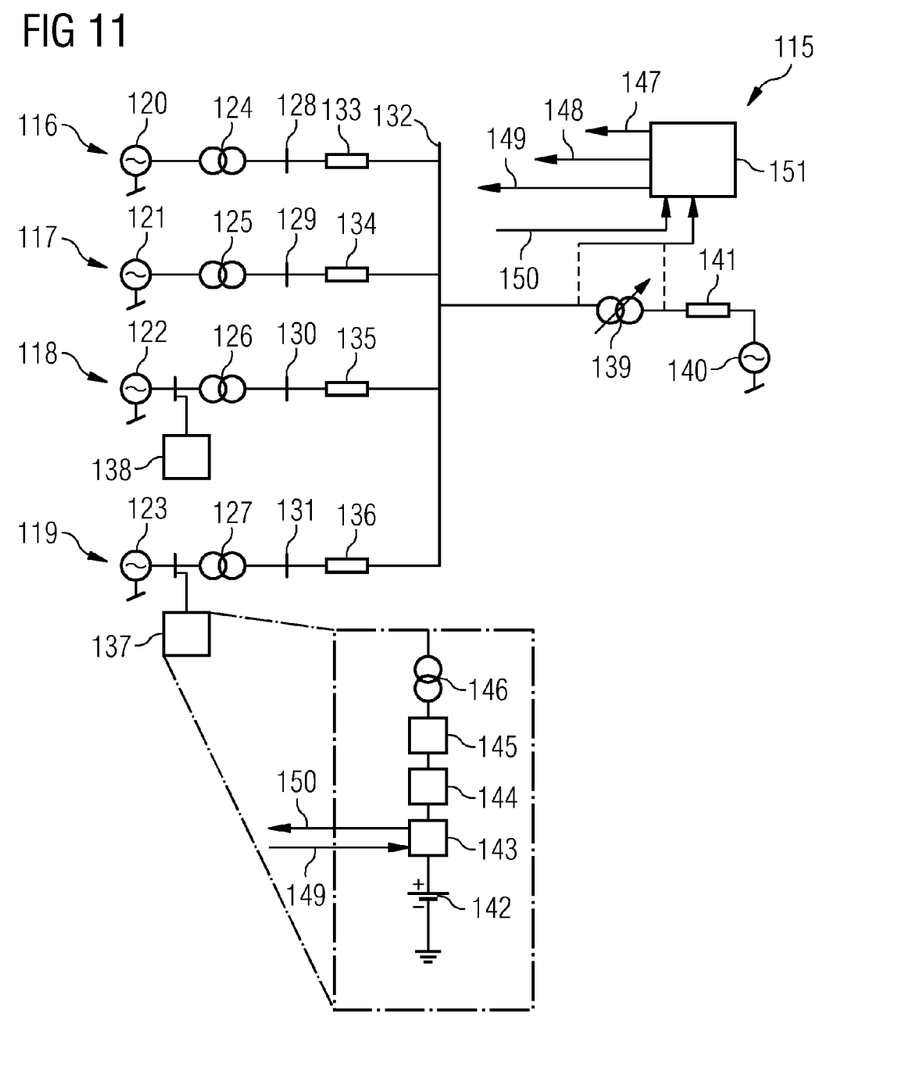
FIG. 11 shows a schematic overview of an embodiment of a wind farm according to the disclosure.

FIG. 11 shows an embodiment of a wind farm 115 with two energy storage elements 138, 137. The energy storage elements are included in the wind turbines 118, 119 of the four wind turbines 116, 117, 118, 119. Each wind farm comprises a generator 120, 121, 122, 123, a wind farm transformer 124, 125, 126, 127 and is connected via cables 128, 129, 130, 131 having an impedance 133, 134, 135, 136 to a point of common coupling 132. The energy storage elements 138, 137 each comprise a battery 142, a control circuit 143, a converter 144, a filter 145 and an injection transformer 146. The control circuits 143 are controlled via signal 150, 149 from the wind farm controller 151, which furthermore controls the wind turbines 116, 117, 118, 119 via control signals 147, 148 based on values measures before and/or after the wind farm transformer 139. The wind farm 115 is connected to an external grid 140 via a reactive power compensator 141.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:
1. A method for operating a wind farm, the wind farm comprising a wind turbine and an energy storage device, the wind farm being connected to an external grid, the method comprising:
   determining a demanded active power;
   determining a demanded reactive power;
   determining power production of the wind turbine;
   discharging the energy storage device, when the power production is below the demanded active power, the demanded reactive power, or the vector sum of demanded active power and demanded reactive power; and charging the energy storage device, when the power production is above the demanded active power, the demanded reactive power, or the vector sum of demanded active power and demanded reactive power.

2. The method for operating a wind farm according to claim 1, the method further comprising:
reducing the power production, when the power production is above a rated power production of the wind turbine.

3. The method for operating a wind farm according to claim 1, the method further comprising:
reducing the power production, when the power production is above the sum of a rated charging power of the energy storage device and either the demanded active power or the demanded reactive power or the vector sum of demanded active power and demanded reactive power.

4. The method for operating a wind farm according to claim 1, the method further comprising:
reducing the power production, when the power production is above the sum of either the demanded active power, the demanded reactive power, or the vector sum of demanded active power and demanded reactive power and when furthermore the energy storage device is full.

5. The method for operating a wind farm according to claim 1, the method further comprising:
determining the external grid voltage; and
providing correctional voltage via the energy storage device, when the external grid voltage differs from a predetermined external grid voltage.

6. A wind farm controller being adapted for operating a wind farm according to a method as set forth in claim 1.

7. The wind farm controller according to claim 6, the wind farm controller further comprising
a memory for storing data indicative of the amount of energy stored within the energy storage element.

8. A wind farm comprising:
a wind turbine;
an energy storage element; and
a wind farm controller according to claim 6.

9. The wind farm according to claim 8,
the energy storage element comprises a battery and/or a flywheel and/or a superconducting magnetic energy storage.

10. The wind farm according to claim 8,
the energy storage element comprises a dynamic voltage restorer.

11. The wind farm according to claim 8,
the energy storage element comprises a bypass switch.

12. The wind farm according to claim 8,
the energy storage element comprises an injection transformer.

13. A computer readable medium on which there is stored a computer program for processing a physical object, the computer program, when being executed by a data processor, is adapted for executing the method as set forth in claim 1.

* * * * *